Jan. 18, 1927.
O. A. HOKANSON
1,614,474
POWER OPERATED BACK SPACER FOR TYPEWRITERS
Filed April 9, 1924
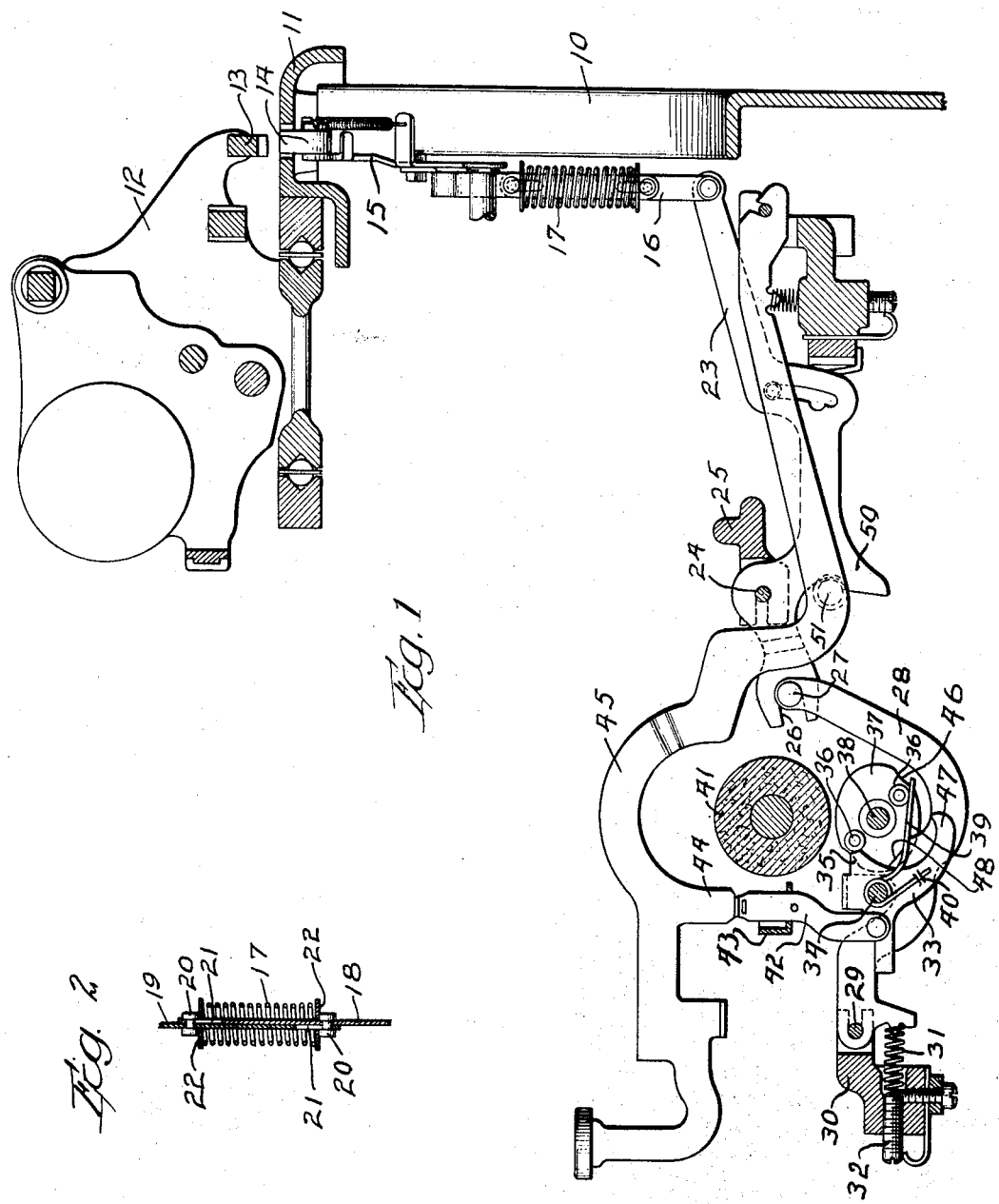
Inventor
Otto A. Hokanson
By Nissen & Crane Attys Patented Jan. 18, 1927.

1,614,474

UNITED STATES PATENT OFFICE.

OTTO A. HOKANSON, OF WOODSTOCK, ILLINOIS, ASSIGNOR TO WOODSTOCK TYPE-WRITER COMPANY, OF WOODSTOCK, ILLINOIS, A CORPORATION OF ILLINOIS.

POWER-OPERATED BACK SPACER FOR TYPEWRITERS.

Application filed April 9, 1924. Serial No. 705,256.

This invention relates to means for producing back letter movement in a typewriting machine operated by a power device such as an electric motor, and has for its object the provision of such mechanism which shall be of improved construction and operation, and in which a slight depression of the backspacing key will cause the carriage to be moved backwardly one letter space, the power for such movement being provided by a motor. The invention is exemplified in the combination and arrangement of parts shown in the accompanying drawing and described in the following specification, and it is more particularly pointed out in the appended claims.

In the drawing:

Figure 1 is a somewhat diagrammatic vertical sectional view of a typewriting machine, showing one embodiment of the present invention applied thereto.

Fig. 2 is a sectional view of a detail of construction.

The present application shows the invention as applied to a Woodstock typewriter having power driving mechanism similar to that shown in my co-pending application, Serial No. 703,927, filed April 3, 1924.

The numeral 10 on the drawing shows the back-plate of the machine frame having a top plate 11 and a carriage 12, slidably mounted thereon. A rack 13 is secured to the rear of the carriage 12 and is operated by a dog 14, controlled by back-spacing levers 15, which may be of any usual or approved construction, the form shown being that of Patent No. 1,214,715. The lever mechanism 15 is operated by a link 16, having a compression spring 17 therein, to provide resiliency in the movement imparted by the link. As shown in Fig. 2, the link 16 comprises two bars 18 and 19, held together by pins 20, which operate in slots 21. The ends of the spring 17 engage washers 22, which abut the pins 20, thus enabling the spring 17 to hold the parts 18 and 19 in extended relation.

The lower end of the link 16 is pivoted to a lever 23, which is mounted on a pivot 24 supported by a cross-bar 25. The front end of the lever 23 is bifurcated at 26, to receive an operating roller 27 carried by the rear end of an actuating lever 28. The lever 28 is pivoted at 29 on a cross-bar 30 and is held in its upper position by a spring 31, having an adjusting screw 32. An escapement dog 33 is pivoted on a cross-shaft 34, and is provided with an abutment stop 35, arranged in the path of a roller 36, carried by a cam disk 37. The disk 37 is journaled on a shaft 38, and is provided with two rollers 36 projecting from the lateral face of the disk in diametrically opposite positions. A spring 39 is coiled upon the shaft 34 and has one end secured to the dog 33 at 40, and has its upper end positioned in the path of the rollers 36, so that it bears against the lower roller and tends to rotate the disk 37 in a counter-clockwise direction as viewed in Fig. 1. A powerdriven roller 41 extends transversely of the machine in position to be engaged by the disk 37 when the disk is released from the abutment stop 35 and moved by the spring 39. The release of the abutment stop 35 is effected by a plunger 42, which extends upwardly through a guide 43 into the path of a downwardly-projecting finger 44 on a keylever 45. When the key lever is slightly depressed, it swings the dog 33 so as to release the abutment 35 and permit rotation of the disk 37 by the spring 39, into contact with the roller 41. The roller 41 being continuously driven in a clockwise direction, as viewed in Fig. 1, continues the rotation of the disk 37 until the depression 46 therein registers with the roller 41. At this time a nose piece 47 on the lower end of the dog 33 intercepts the roller 36 and arrests the disk 37. When the key is released, the dog 33 will return to the position shown in Fig. 1, and the disk will continue to rotate under the influence of the spring 39 until it is arrested by the abutment 35 in its position of rest shown in Fig. 1. It is thus seen that a slight depression of the key lever 45 will cause a half turn of the disk 37 under the power of the roller 41.

Each time the disk 37 is operated, one of the rollers 36 will engage a cam face 48 on the lever 28, and impart a downward reciprocation to the lever 28. This will be transmitted through the pin and slot 26 and 27, to the lever 23, so that the rear end of the lever 23 will be moved upwardly to actuate the back-spacing mechanism, and so move the carriage 12 backwardly one letter space. The power-actuated drive for the lever 28 is similar to that shown in my prior application referred to above. In that application, mechanism is described by which the guide bar 43 may be swung forwardly to permit hand operation of the typewriter. When this occurs, the plunger 42 is brought out of registration with the finger 44, so that the key lever 45 may be given a downward movement of greater extent than that imparted to it for power operation. In this position, depression of the key lever does not affect the power-operating mechanism. In order to produce a back-spacing movement by the hand operation of the key lever, the lever 23 carries a downwardly-projecting lug 50, positioned in the path of a roller 51, on the key lever 35. Sufficient clearance is permitted between the lug 50 and roller 51 to permit movement of the lever 45 for power operation without engagement between the lug and roller. When the parts are set for hand operation, however, the increased amount of depression permitted to the key lever 45 causes the roller 51 to engage the lug 50 and so operate the back-spacing lever 23.

Having thus described my invention, what I claim as new and desire to secure by Letters Patent of the United States, is:

1. In a typewriting machine, back-spacing mechanism, a power drive, a key lever for controlling said power drive to actuate said back-spacing mechanism, means operable by said key lever for manually actuating said back-spacing mechanism, a connecting member between said key lever and power drive, and means for rendering said connecting member inoperative to permit manual actuation of said back-spacing mechanism by said key lever.

2. In a typewriting machine, back-spacing mechanism, a power drive, a key lever, means controlled by said key lever for causing operation of said back-spacing mechanism by said power drive, said key-lever controlled means being movable to inoperative position to permit actuation of said key lever without causing power operation of said back-spacing mechanism, and means actuated by said key lever when so moved for operating said back-spacing mechanism.

3. In a typewriting machine, back spacing mechanism, a key lever, means movable independently of said key lever for operating said back-spacing mechanism, a power drive for actuating said operating means, and means arranged to be moved by said key lever for actuating said operating means.

4. In a typewriting machine, back-spacing mechanism, a member for actuating said back-spacing mechanism, a key lever, a connection between said key lever and said member for moving said member but permitting movement of said member independently of said key lever, and a power drive controlled by said key lever for actuating said movable member.

5. In a typewriting machine, back-spacing mechanism, a member for actuating said back-spacing mechanism, a key lever, means for moving said member when said key lever is depressed a given amount, but permitting a less depression of said key lever without moving said actuating member, a power drive for moving said actuating member, and means controlled by said key lever when moved a slight distance for causing operation of said actuating member by said power drive.

6. In a typewriting machine, a paper carriage, back-spacing mechanism for said carriage, means including a resilient shock absorber for actuating said back-spacing mechanism, a key lever having lost motion connections with said actuating means for operating said back-spacing mechanism, a power drive, means cooperating with said key lever during the movement permitted by said lost-motion connection to cause operation of said back-spacing mechanism by said power drive, said last-named means being movable to an inoperative position to permit a greater movement of said key lever to effect hand operation of said back-spacing mechanism.

In testimony whereof, I hereto affix my name.

OTTO A. HOKANSON.